(12) United States Patent
Schmidt et al.

(10) Patent No.: US 9,570,729 B2
(45) Date of Patent: Feb. 14, 2017

(54) ELECTRICAL ENERGY STORAGE MODULE AND METHOD FOR PRODUCING AN ELECTRICAL ENERGY STORAGE MODULE

(71) Applicant: Robert Bosch GmbH, Stuttgart (DE)

(72) Inventors: Alexander Schmidt, Donaueschingen (DE); Andy Tiefenbach, Vaihingen-Horrheim (DE); Volker Doege, Dischingen (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 14/366,926

(22) PCT Filed: Oct. 29, 2012

(86) PCT No.: PCT/EP2012/071400
§ 371 (c)(1),
(2) Date: Jun. 19, 2014

(87) PCT Pub. No.: WO2013/091960
PCT Pub. Date: Jun. 27, 2013

(65) Prior Publication Data
US 2014/0370348 A1    Dec. 18, 2014

(30) Foreign Application Priority Data
Dec. 19, 2011    (DE) .......... 10 2011 089 087

(51) Int. Cl.
*H01M 2/20*    (2006.01)
*H01M 2/26*    (2006.01)
(Continued)

(52) U.S. Cl.
CPC ............. *H01M 2/204* (2013.01); *H01M 2/206* (2013.01); *H01M 2/26* (2013.01);
(Continued)

(58) Field of Classification Search
CPC ........ H01M 2/204; H01M 2/206; H01M 2/26; H01M 10/0418; H01M 10/0472; H01M 10/18; H01M 10/20; H01M 10/0525; H01M 10/052
(Continued)

(56) References Cited

U.S. PATENT DOCUMENTS 3,390,014 A * 6/1968 Eisler ............... H01M 10/0413
                                                    429/150
3,933,522 A * 1/1976 Steig ....................... H01M 2/00
                                                    429/148
(Continued)

FOREIGN PATENT DOCUMENTS

EP    1211740    6/2002
JP    2008251471    10/2008
(Continued)

OTHER PUBLICATIONS

International Search Report for Application No. PCT/EP2012/071400 dated Jan. 4, 2013 (English Translation, 2 pages).

*Primary Examiner* — Jonathan G Leong
*Assistant Examiner* — Anne R Dixon
(74) *Attorney, Agent, or Firm* — Michael Best & Friedrich LLP

(57) ABSTRACT

The invention relates to an electrical energy storage module, comprising at least one storage cell stack (7) that has a plurality of groups of first planar parallel energy storage cells (1), each having first electrode elements (1*a*), and a plurality of groups of second planar parallel energy storage cells (2) arranged planar parallel to the group of first energy storage cells (1), said second groups each having second electrode elements (2*a*). The groups of first and second energy storage cells (1; 2) are arranged alternately along a first direction of extension of the storage cell stack (7) and the first electrode elements (1*a*) have a polarity on a side (Continued)

face of the storage cell stack (7) that is different from the second electrode elements (2a) on the side face of the storage cell stack (7). The energy storage module further comprises a plurality of flat contact elements (5) that are arranged on the side faces of the storage cell stack (7), galvanically connect adjacent groups of first and second energy storage cells (1; 2), and contact substantially all first or second electrode elements (1a; 2a) of the adjacent groups of first and second energy storage cells (1; 2) across the width of the storage cell stack (7) in each case.

9 Claims, 2 Drawing Sheets

(51) Int. Cl.
    *H01M 10/04*     (2006.01)
    *H01M 10/18*     (2006.01)
    *H01M 10/0525*     (2010.01)
    *H01M 10/052*     (2010.01)

(52) U.S. Cl.
    CPC ... *H01M 10/0418* (2013.01); *H01M 10/0472* (2013.01); *H01M 10/18* (2013.01); *H01M 10/052* (2013.01); *H01M 10/0525* (2013.01); *Y02E 60/126* (2013.01); *Y02P 70/54* (2015.11); *Y10T 29/49108* (2015.01)

(58) Field of Classification Search
    USPC .................................. 429/94, 121; 29/623.1
    See application file for complete search history.

(56) References Cited

U.S. PATENT DOCUMENTS

| | | | | |
|---|---|---|---|---|
| 5,140,744 | A | * | 8/1992 | Miller .................. A47B 87/00 |
| | | | | 29/730 |
| 2004/0050414 | A1 | | 3/2004 | Oogami |
| 2011/0076521 | A1 | | 3/2011 | Shimizu et al. |
| 2011/0117406 | A1 | | 5/2011 | Cho et al. |
| 2011/0159336 | A1 | | 6/2011 | Ohkura et al. |

FOREIGN PATENT DOCUMENTS

| | | |
|---|---|---|
| JP | 2009009853 | 1/2009 |
| JP | 2009009889 | 1/2009 |
| JP | 2010067456 | 3/2010 |
| JP | 2010272430 | 12/2010 |
| JP | 2011086483 | 4/2011 |
| WO | 2007082863 | 7/2007 |

\* cited by examiner

ELECTRICAL ENERGY STORAGE MODULE AND METHOD FOR PRODUCING AN ELECTRICAL ENERGY STORAGE MODULE

BACKGROUND OF THE INVENTION

The invention relates to an electrical energy storage module and to a method for producing an electrical energy storage module.

Direct current is usually extracted from electrical energy storage cells or direct current is fed into said cells. For this reason, the previously known design of energy storage cells is configured to optimize the ohmic internal resistances and the specific energy density or power density of the energy storage cells.

In many applications of electrical energy storage cells, storage cells are connected to one another in a serial or parallel arrangement to form battery modules in order to set desired output parameters such as total voltage, voltage range, energy content or power density. If currents with a rising alternating component are extracted from such energy storage cells, the influence of the distributed inductance of the energy storage cells rises as a function of the frequency. The inductive losses of an energy storage cell are composed of the individual components of the loss contributions of the electrodes, the pole connection and the arrangement of the electrodes in the housing. Furthermore, at operational frequencies in the kHz range, the skin effect can result in losses in regions which conduct the current and in eddy currents in electrically conductive faces, for example in the housing.

Document DE 10 2010 035 114 A1 discloses, for example, a battery unit having a plurality of cell units which each have accumulator cells which are electrically coupled via bus rails.

There is a need for energy storage modules composed of one or more energy storage cells which have relatively low losses in terms of the extraction of high-frequency alternating currents and therefore improve the efficiency of the system using the energy storage cells.

SUMMARY OF THE INVENTION

The present invention provides, according to one aspect, an electrical energy storage module, comprising at least one storage cell stack which has a plurality of groups of first, planar-parallel energy storage cells which each have first electrode elements, and a plurality of groups of second, planar-parallel energy storage cells which are arranged planar-parallel to the groups of first energy storage cells and each have second electrode elements. In this context, the groups of first and second energy storage cells are arranged alternately along a first direction of extent of the storage cell stack, and the first electrode elements have, on a side face of the storage cell stack, a different polarity from the second electrode elements on the side face of the storage cell stack. The energy storage module also comprises a plurality of planar contact elements which are arranged on the side faces of the storage cell stack and which galvanically connect adjacent groups of first and second energy storage cells and which essentially contact all the first or second electrode elements of the adjacent groups of first and second energy storage cells, in each case over the width of the storage cell stack.

According to a further aspect, the present invention provides a method for manufacturing an electrical energy storage module, comprising the steps of alternating arrangement of a plurality of groups of first planar-parallel energy storage cells which each have first electrode elements, and a plurality of groups of second planar-parallel energy storage cells which are arranged planar-parallel with respect to the groups of first energy storage cells and each have second electrode elements, in at least one storage cell stack along a first direction of extent of the storage cell stack, wherein the first electrode elements have, on a side face of the storage cell stack, a different polarity from the second electrode elements on the side face of the storage cell stack, and of making contact essentially with all the first or second electrode elements of the adjacent groups of first and second energy storage cells, in each case over the width of the storage cell stack, using a plurality of planar contact elements which are arranged on the sides faces of the storage cell stack and which galvanically connect adjacent groups of first and second energy storage cells.

An idea of the present invention is to reduce the losses which are caused by eddy currents occurring during the actuation of an electrical energy storage module in the interior of the energy storage module and/or in the housing thereof, by means of a suitable internal design of the energy storage module with the lowest possible internal cell inductance. For this purpose, the energy storage cells of the electrical energy storage module are suitably arranged in such a way that, on the one hand, the total length of the necessary current-conducting conductor elements and, on the other hand, the number of contact junctions between the individual connected energy storage cells and housing parts is minimized.

A considerable advantage is that the energy loss, in particular when extracting high-frequency alternating current from the energy storage module can be considerably reduced. In particular in the case of battery systems with an integrated power inverter, what are referred to as battery direct inverters (BDI), in which a rapid changeover of the routing of the current through a battery module occurs in order to vary the current voltage, this reduction of the energy loss is highly advantageous.

A further advantage is that the short-term dynamics of such energy storage modules are improved by virtue of the fact that the deceleration of the outputting of energy or load by the energy storage cells after load changes is minimized. As a result, it is advantageously possible to dispense with otherwise possibly compensating components such as, for example, buffer capacitors, which can reduce the installation space requirement and the production costs of components using energy storage cells or modules.

Moreover, by avoiding inductive loss components by means of the energy storage cells it is possible to improve the electromagnetic compatibility (EMC) since the emitted electromagnetic field can be reduced and interference influences on adjacent electronics components can be decreased. Furthermore, ohmic losses are reduced as far as possible, for example as a result of the skin effect, which advantageously entails an increased efficiency level and less generation of heat.

According to one embodiment, the energy storage module according to the invention can also have a first planar pole terminal which makes electrical contact with first electrode elements of a group of first energy storage cells arranged on a first end face of the storage cell stack, and a second planar pole terminal which makes electrical contact with second electrode elements of a group of second energy storage cells arranged on a second end face of the storage cell stack, wherein the first planar pole terminal and the second planar pole terminal are made to extend parallel to one another along a side face of the storage cell stack.

According to a further embodiment, the energy storage module according to the invention can have two storage cell stacks which adjoin one another at the side faces and each have groups of first planar-parallel energy storage cells and groups of second planar-parallel energy storage cells.

In this context, according to one advantageous embodiment, the energy storage module according to the invention can also have a first planar pole terminal which makes electrical contact with first electrode elements of a group of first energy storage cells arranged on an end face of a first storage cell stack, and a second planar pole terminal which makes electrical contact with first electrode elements of a group of first energy storage cells arranged on an end face of a second storage cell stack, wherein the first planar pole terminal and the second planar pole terminal are arranged parallel to one another between the two storage cell stacks.

According to a further embodiment, the energy storage module according to the invention can also have an insulation layer which is arranged between the first planar pole terminal and the second planar pole terminal in order to galvanically insulate the pole terminals.

According to a further embodiment, the energy storage module according to the invention can also have a housing which includes the groups of first planar-parallel energy storage cells, the groups of second planar-parallel energy storage cells and the plurality of contact elements.

In this context, in one embodiment the housing can be composed of an electrically non-conductive or only slightly electrically conductive material.

According to a further embodiment of the energy storage module according to the invention, the first and second electrode elements can be wound in a spiral shape one in the other.

According to a further embodiment of the energy storage module according to the invention, the first and second electrode elements can be embodied as electrode stacks composed of individual layers or as a folding stack.

Further features and advantages of embodiments of the invention can be found in the following description with reference to the appended drawings.

DETAILED DESCRIPTION

Figure 1:
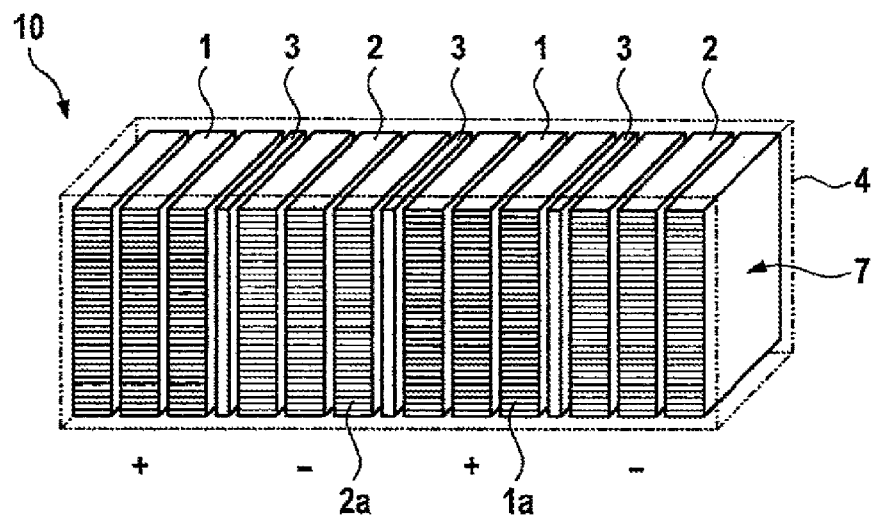
FIG. 1 shows a schematic illustration of an arrangement of electrical energy storage cells.

The direction terminology used below, that is to say terms such as "on the left", "on the right", "at the top", "at the bottom", "at the front", "at the rear", "above the latter", "behind the latter" and the like, is used merely for the purpose of better understanding of the drawings and should not be considered in any case to constitute a limitation of the generality. Identical reference symbols generally denote components of the same type or with the same effect.

Electrical energy storage cells according to the present invention comprise all devices which can store electrical energy over a predefined time period and can output it again over a further time period. Energy storage cells, according to the present invention comprise here all types of secondary and primary energy stores, in particular electrically capacitive, electrochemical (Faraday's) and store types which operate in a combined fashion. The time periods which are considered can comprise here from seconds up to hours, days or years. Electrical energy storage cells can comprise, for example, lithium-ion cells, lithium polymer cells, nickel metal hydride cells, ultra-capacitors, super-capacitors, power-capacitors, bat caps, accumulators based on lead, zinc, sodium, lithium, magnesium, sulfur or other metals, elements or alloys or similar systems. The functionality of the electrical energy storage cells which are included by the invention can be based here on intercalation electrodes, reaction electrodes or alloy electrodes in combination with aqueous, aprotic or polymer electrolytes.

The design of electrical energy storage cells according to the present invention can comprise here both different outer design shapes such as, for example, prismatic shapes or what are referred to as pouch shapes as well as different electrode structures such as, for example, wound, stacked, folded or other structures.

Electrode elements according to the present invention can be produced from various electrically conductive, for example, metallic materials. Electrode elements according to the present invention can be produced in a coated form, three-dimensionally filled and/or with a large active surface. In this context, the planar electrode elements can have different dimensions depending on the storage technology, for example the thickness of electrode elements can have orders of magnitude of several m to a few mm. The electrode elements can be folded, stacked or wound, and it is possible to provide for insulation layers or separation layers to be formed between the electrode elements, which insulation layers or separation layers galvanically separate the electrode elements from one another and can divide the electrolyte within the cell housing into individual regions. It is also possible to provide for the electrode elements to be constructed in a bipolar form. The planar shape of the electrode elements can be square, rectangular, round, elliptical or configured in any other desired way.

Electrical energy storage modules according to the present invention comprise components which have one or more electrical energy storage cells in a housing, wherein the electrical energy storage cells are electrically coupled to one another in a suitable way in order to ensure serial or parallel connection of the energy storage cells. Electrical energy storage modules can have module terminals at which an output voltage, dependent on the internal connection of the electrical energy storage cells of the electrical energy storage module, can be tapped.

Housings according to the present invention comprise all components which have a recess for receiving one or more electrical energy storage cells and the electrically conductive connection elements of the electrical energy storage cells and which can screen the received energy storage cells and elements mechanically and/or electrically from the outside world. Housings in this context can have electrically conductive materials, electrically non-conductive or only slightly conductive materials or combinations of partial regions of such materials such as, for example, plastics, metals, or alloys made of metals. The shape and size of the housings can be adapted here to the received energy storage cells and elements.

FIG. 1 shows a schematic illustration of an arrangement of electrical energy storage cells 10. The arrangement 10 comprises a plurality of planar electrical energy storage cells 1 and 2 which are arranged side by side in a storage cell stack 7 along their surface normal direction. The storage cell stack 7 has here a first direction of extent which runs from left to right in FIG. 1, for example. The storage cell stack 7 can have in each case square end faces which are connected along the first direction of extent by means of four side faces. In the exemplary embodiment in FIG. 1, the storage cell stack 7 has rectangular end faces, but other end face shapes such as, for example, a square or a trapezoidal shape are also possible.

The energy storage cells 1 and 2 have a plurality of electrode elements 1*a* and 2*a*. The electrode elements 1*a* and 2*a* can have electrodes which are wound, for example, one in the other in the shape of a spiral, stacked electrodes or electrodes which are folded onto one another. In this context, electrode elements with different polarity may be present per energy storage cell 1 and 2, which electrode elements are galvanically isolated from one another within the energy storage cell 1 and 2. The electrode elements can be, for example, flat layers made of electrically conductive material, said layers being intermeshed one in the other in a planar fashion in a cone-like structure. It may also be possible for the electrode elements to be given an alternative stack shape by winding or folding a band made of layered electrode elements. It should be clear here that there are a wide variety of possible ways in which the electrode elements 1*a* and 2*a* can be arranged in an energy storage cell 1 and 2 and in which the selection of an arrangement can be dependent on the storage technology used, the peripheral conditions with respect to the outer shape of the energy storage cell 1 and 2 and/or the electrical characteristics which are to be obtained for the energy storage cell 1 and 2.

For example it may be advantageous to arrange the electrode elements 1*a* and 2*a* in such a way that the internal volume of the energy storage cells 1 and 2 is utilized to a maximum extent.

The energy storage cells 1 differ from the energy storage cells 2 to the extent that they are arranged in the storage cell stack 7 in a mirror inverted fashion with respect to their polarity. In other words, the energy storage cells 1 are arranged in such a way that they have electrode elements 1*a* with a positive polarity on the front side face of the storage cell stack 7 and electrode elements 1*a* with a negative polarity on the rear side face of the storage cell stack 7. In contrast to this, the energy storage cells 2 are arranged in such a way that they have electrode elements 2*a* with a negative polarity on the front side face of the storage cell stack 7 and electrode elements 2*a* with a positive polarity on the rear side face of the storage cell stack 7. The energy storage cells 1 and 2 can be electrically insulated from one another here, for example by dividing elements 3 in each case. The dividing elements 3 serve, in particular, to divide up the electrolyte into segments so that a specific difference in the electrical potential within this segment in the electrolyte is not exceeded. The latter may have in this context, for example, thin layers of electrically non-conductive or only slightly conductive materials. The number of the energy storage cells 1 and 2 which are in each case arranged one next to the other and oriented in the same direction is represented by way of example by three in FIG. 1, but any other number of energy storage cells arranged one next to the other with the same orientation is also possible. The arrangement of cells in the same direction means electrically a parallel connection of the cells, which permits, in particular, relatively high currents to be formed. The connection of such a package to one composed of cells in the opposite direction corresponds to a series connection with the corresponding addition of the individual voltages.

The storage cell stack 7 can be surrounded by a housing 4 which is, for example, prismatic in FIG. 1. However, it is clear that any other shape is also possible for the housing 4 and that this shape can be dependent, for example, on the dimensions of the enclosed energy storage cells 1 and 2.

Figure 2:
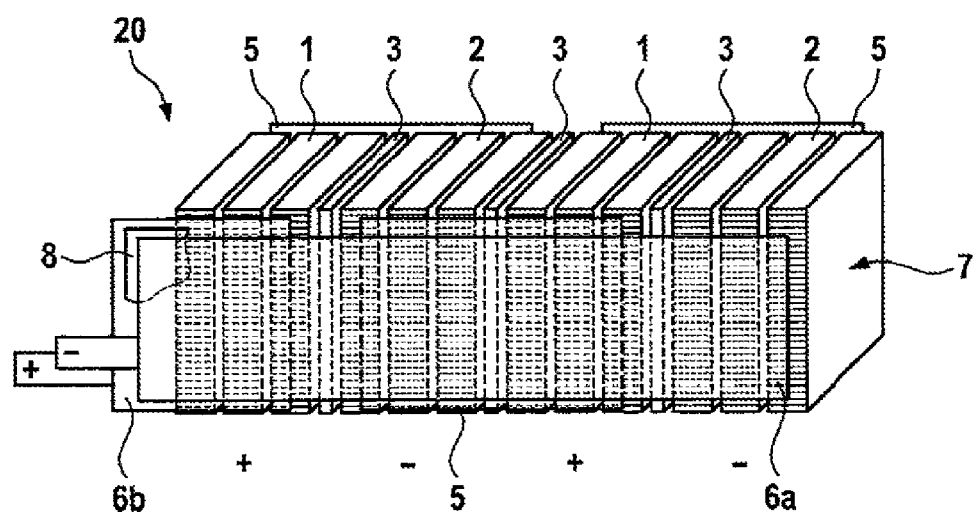
FIG. 2 shows a schematic illustration of an electrical energy storage module according to one embodiment of the invention.

FIG. 2 shows a schematic illustration of an electrical energy storage module 20 which has an arrangement of electrical energy storage cells. The arrangement of electrical energy storage cells can correspond here, for example, to the arrangement 10 in FIG. 1. However, it should be clear here that any other arrangement with adaptation of the respectively connected elements for the electrical energy storage module 20 is also possible.

The electrical energy storage module 20 has planar contact elements 5 which make lateral contact with respectively adjacent groups of energy storage cells 1 and 2 and connect them to one another. In this context, the planar contact elements 5 each connect electrode elements 1*a* and 2*a* with a different polarity. The planar contact elements 5 can each have a direction of surface extent which is perpendicular to the directions of surface extent of the electrode elements 1*a* and 2*a* and the side faces of the energy storage cells 1 and 2. The planar contact elements 5 can have, for example, layers, flat bands or layered elements made of electrically conductive material. The planar contact elements 5 essentially make contact here with all the first or second electrode elements 1*a* and 2*a* of the adjacent groups of energy storage cells 1 and 2 in each case along their direction of surface extent, over the width of the storage cell stack 7. The planar contact elements 5 preferably make contact with a plurality of electrode elements 1*a* and 2*a* per energy storage cell 1 and 2, with the result that the electrical connection path between adjacent energy storage cells 1 and 2 is as small as possible. At the same time, the current density is distributed with maximum homogeneity over the large surface extent of the respective contact elements 5.

The planar formation of contact between the contact elements 5 and the electrode elements 1*a* and 2*a* can be achieved, for example, by means of welding, spraying, sputtering or bonding methods. In this context it is possible to provide for the excess dimension of the contact elements 5 to be kept as small as possible over the vertical extent of the respective layers of electrode elements 1*a* and 2*a* in order to avoid superfluous current paths.

The contact elements 5 are arranged alternately on the front and rear sides of the storage cell stack 7, with the result that a meandering or serpentine current path is produced between adjacent energy storage cells 1 and 2 along the longitudinal extent of the storage cell stack 7. The number of groups of adjacent energy storage cells 1 and 2 which are arranged in the same way is preferably an even number with the result that the end contacts, respectively not connected via contact elements 5, of the groups, each located at the end side of the storage cell stack 7, of adjacent energy storage cells 1 and 2 which are arranged in the same way are located on the same side of the storage cell stack 7. In the case which is illustrated by way of example, in FIG. 2, these end contacts are located on the front side at the left-hand and right-hand ends of the storage cell stack. The end contacts can be electrically contacted in each case via pole terminals and pole contact terminals 6*a* and 6*b*.

The pole terminals or pole contact terminals 6*a* and 6*b* can, in this context, each have planar elements which are lead in a planar-parallel fashion with respect to one another to an end side of the storage cell stack 7. In the present example in FIG. 2 the pole contact terminals 6a and 6b are led to the left-hand side of the storage cell stack 7. A smallest possible distance between the pole contact terminals 6a and 6b can be selected in order to keep the through-flow surface enclosed by the pole contact terminals 6a and 6b and therefore the inductive impedance of the pole contact terminals 6a and 6b as small as possible.

It is optionally possible here to provide for an insulation layer 8, indicated in sections in FIG. 2, to be introduced between the pole contact terminals 6a and 6b in order to ensure galvanic isolation between the pole contact terminals 6a and 6b. The insulation layer 8 can also extend between the front-side contact elements 5 and the pole contact terminal 6a for the purpose of achieving corresponding galvanic insulation.

The pole terminals or pole contact terminals 6a and 6b can, for example, run with their surfaces flush with one another over as large an area as possible. An output voltage of the energy storage module 10 can then be tapped between the respective ends of the pole contact terminals 6a and 6b. The electrical energy storage module 10 in FIG. 2 can also have a housing 4 which is not explicitly illustrated in FIG. 2 for reasons of clarity.

Figure 3:
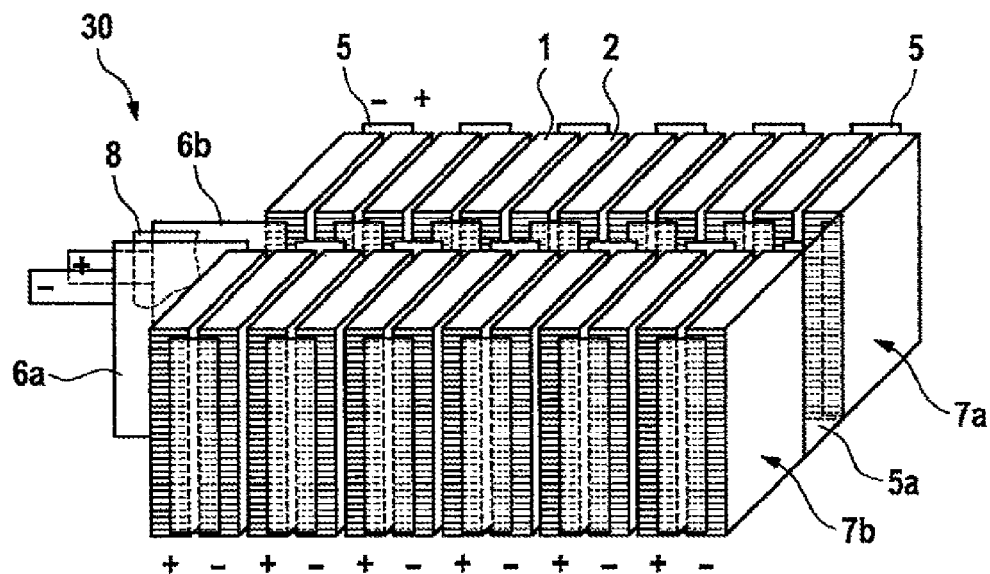
FIG. 3 shows a schematic illustration of an energy storage module according to a further embodiment of the invention.

FIG. 3 shows a schematic illustration of an electrical energy storage module 30 which has an arrangement of electrical energy storage cells. The electrical energy storage cells can correspond here to the energy storage cells 1 or in FIG. 1. The electrical energy storage module 30 has an arrangement of two storage cell stacks 7a and 7b which are arranged parallel to one another. Without limiting the generality, the storage cell stack 7a which is illustrated in the background will be referred to below as the rear storage cell stack, and the storage cell stack 7b which is illustrated in the foreground will be referred to as the front storage cell stack. The number of groups of adjacent energy storage cells 1 and 2 which are arranged in the same way in both the storage cell stacks 7a and 7b can be equal and be an even number. The number of energy storage cells 1 and 2 per group is represented by way of example by one in FIG. 3, with any other number also being possible. The electrical energy storage module 30 has no dividing elements between the energy storage cells 1 and 2; however, it goes without saying that, as illustrated in FIG. 1, corresponding dividing elements 3 can be provided between the groups of adjacent energy storage cells 1 and 2 which are arranged in the same way.

Similarly to the energy storage module 20 illustrated in FIG. 2, adjacent energy storage cells 1 and 2 of each storage cell stack 7a and 7b are connected to one another via contact elements 5, wherein the front-side contact elements 5 are each arranged in an alternating fashion with respect to the rear-side contact elements 5, with the result that a meandering or serpentine current path is produced between adjacent energy storage cells 1 and 2 along the longitudinal extent of the storage cell stacks 7a and 7b. Those last energy storage cells 2 of the two storage cell stacks 7a and 7b which are respectively located on the right can be electrically connected via a contact element 5a which extends over the entire stack with the result that a current path which extends over the entire stack is produced, said current path running back in the meandering shape from the left-hand side of the rear storage cell stack 7a to the right-hand side of the rear storage cell stack 7a and from the right-hand side of the front storage cell stack 7a to the left-hand side of the front storage cell stack 7b. In each case pole terminals or pole contact terminals 6a and 6b can be provided at the respective end contacts of the storage cell stacks 7a and 7b, that is to say on the rear side of that energy storage cell 1 of the front storage cell stack 7b which is located furthest to the left, and on the front side of that energy storage cell 1 of the rear storage cell stack 7a which is located furthest to the left.

The pole terminals or pole contact terminals 6a and 6b may have here analogous properties to those described in relation to FIG. 2. In particular, an optional insulation layer 8 can be provided which is introduced between the pole contact terminals 6a and 6b in order to ensure galvanic isolation between the pole contact terminals 6a and 6b. The insulation layer 8 can also extend between the front-side contact elements 5 of the rear storage cell stack 7a and the rear-side contact elements 5 of the front storage cell stack 7b for the purpose of achieving corresponding galvanic insulation.

In FIG. 3, for reasons of clarity, no housing is illustrated again even though the energy storage module 20 can have a housing 4 which can ensure mechanical and/or electrical screening of the energy storage module 20 from the outside world.

Overall, FIGS. 2 and 3 merely show exemplary embodiments of energy storage modules. Variations and modifications can be configured taking into account expedient structure criteria. In general it is advantageous to keep the distances between current-conducting elements of the two polarities as short as possible in order to minimize the active through-flow surface which is enclosed by these elements. This means that the inductive impedance of the current-conducting elements in the interior of the energy storage modules can be minimized. Furthermore it is advantageous to make the current-conducting elements as large in area as possible in order to distribute the current density as homogenously as possible. If ideally planar pole contact formation, bearing closely against the active areas of the electrode element is possible only under specific peripheral conditions such as, for example, safety requirements or technical constraints, it is necessary to ensure at least that the current-conducting elements of different polarities are brought together at a short distance from one another. Furthermore it is advantageous to minimize the number of necessary pole terminals of the energy storage cells to the housing by suitable module-internal connection of the energy storage cells. As a result the ohmic line resistances are reduced, which in turn causes the ohmic losses, in particular owing to the skin effect, to be minimized both in the direct-current and alternating-current operating modes.

The illustrated energy storage modules can preferably be used, for example, in systems in which high-frequency alternating currents are extracted from the energy storage cells, for example in battery direct inverters with actuation frequencies above approximately 100 Hz. In these systems, inductive losses owing to the high alternating current frequency can be minimized owing to the design of the energy storage modules. At the same time, the response behavior of the energy storage modules in the short-term range is improved, which considerably improves the dynamics and reliability of the systems.

Figure 4:
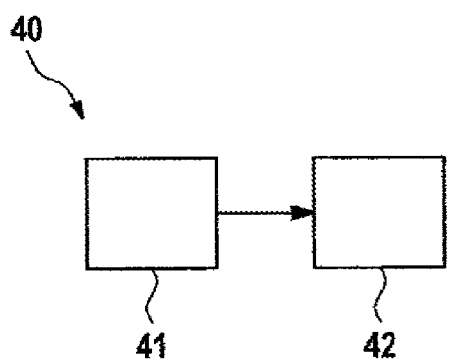
FIG. 4 shows a schematic illustration of a method for producing an electrical energy storage module according to a further embodiment of the invention.

FIG. 4 shows a schematic illustration of a method 40 for manufacturing an electrical energy storage module, in particular one of the energy storage modules 20 or 30 shown schematically in FIGS. 2 and 3. In a first step 41, a plurality of groups of first planar-parallel energy storage cells 1, which each have first electrode elements 1a, are arranged to alternate with a plurality of groups of second planar-parallel energy storage cells 2 which are arranged planar-parallel to the groups of first energy storage cells 1 and each have second electrode elements 2a, in at least one storage cell stack 7, 7a, 7b along a first direction of extent of the storage cell stack 7, 7a, 7b, wherein the first electrode elements 1a have a different polarity on a side face of the storage cell stack 7, 7a, 7b from the second electrode elements 2a on the side face of the storage cell stack 7, 7a, 7b. In a second step 42, contact is formed essentially with all the first or second electrode elements 1a, 2a of the adjacent groups of first and second energy storage cells 1, 2, in each case over the width of the storage cell stack 7, 7a, 7b, using a plurality of planar contact elements 5 which are arranged on the side faces of the storage cell stack 7, 7a, 7b and which galvanically connect adjacent groups of first and second energy storage cells 1, 2. In this context, the planar contact elements 5 can be placed in contact with the electrode elements 1a, 2a by, for example, a welding method, a spraying method, a sputtering method or a bonding method. The electrical resistance of the connecting point between the respective contact element 5 and the electrode elements 1a, 2a is preferably to be kept as short as possible here.

The first and second planar-parallel electrode elements 1 and 2 can be suitably stacked, folded or wound, depending on the desired cell topology, for example before the formation of contact with the respective contact elements 5. For example for what is referred to as a pouch cell the first and second electrode elements 1a and 2a can be folded or layered on one another using an insulating separator layer in meandering tracks. In order to form a prismatic cell, it is possible, for example, to use a "race track pancake" topology or a "race track double pancake" topology, that is to say a flat spiral-shaped winding of first and second electrode elements 1a and 2a which can be compressed along a cross-sectional direction of the winding which is produced in order to obtain a "race track" shape, that is to say a winding path which is connected by means of tight external radii and runs essentially parallel.

The storage cell stack 7, 7a, 7b and the contact elements 5 can optionally be enclosed in a housing 4. In this context, the first and second pole terminals 6a, 6b can be led out of the housing 4 as electrical terminals of the energy storage module.

The invention claimed is:

1. An electrical energy storage module (20), comprising:
   at least one storage cell stack (7) which has oppositely-facing end faces and a plurality of side faces connecting the end faces, the storage cell stack (7) further including:
   a plurality of groups of first planar-parallel energy storage cells (1) which each have first electrode elements (1a), and
   a plurality of groups of second planar-parallel energy storage cells (2) which are arranged planar-parallel to the plurality of groups of first planar-parallel energy storage cells (1) and each have second electrode elements (2a),
   wherein the plurality of groups of first and second planar-parallel energy storage cells (1; 2) are arranged alternately along a first direction of extent of the storage cell stack (7) from one of the oppositely-facing end faces to the other of the oppositely-facing end faces, and
   wherein the first electrode elements (1a) impart to a first side face of the plurality of side faces of the storage cell stack (7) a different polarity from a polarity imparted to the first side face by the second electrode elements (2a); and
   a plurality of planar contact elements (5) which are arranged on the first side face and on a second side face of the plurality of side faces of the storage cell stack (7) and which galvanically connect adjacent groups of first and second planar-parallel energy storage cells (1; 2) and which essentially contact all the first or second electrode elements (1a; 2a) of the adjacent groups of first and second planar-parallel energy storage cells (1; 2);
   a first planar pole terminal (6b) which makes electrical contact with first electrode elements (1a) of a group of first planar-parallel energy storage cells (1) arranged at a first end face of the storage cell stack (7); and
   a second planar pole terminal (6a) which makes electrical contact with second electrode elements (2a) of a group of second planar-parallel energy storage cells (2) arranged at a second end face of the storage cell stack (7),
   wherein the first planar pole terminal (6b) and the second planar pole terminal (6a) are made to extend parallel to one another and adjacent to one another along the first side face of the storage cell stack (7).

2. An electrical energy storage module (30) comprising: two storage cell stacks (7a; 7b), each storage cell stack (7a; 7b) having oppositely-facing end faces and a plurality of side faces connecting the end faces, the two storage cell stacks (7a; 7b) adjoining one another at a first side face of one of the two storage cell stacks (7a) and at a first side face of the other of the two storage cell stacks (7b), each storage cell stack (7a; 7b) further including:
   a plurality of first planar-parallel energy storage cells (1) which each has first electrode elements (1a), and
   a plurality of second planar-parallel energy storage cells (2) which are arranged planar-parallel to the first planar-parallel energy storage cells (1) and each has second electrode elements (2a),
   wherein the plurality of first and second planar-parallel energy storage cells (1; 2) are arranged alternately along a first direction of extent of the storage cell stack (7a; 7b) from one of the oppositely-facing end faces to the other of the oppositely-facing end faces, and
   wherein the first electrode elements (1a) impart to a first side face of the plurality of side faces of the storage cell stack (7a; 7b) a different polarity from a polarity imparted to the first side face by the second electrode element (2a); and
   a plurality of planar contact elements (5) which are arranged on the first side face and on a second side face of the plurality of side faces of the storage cell stack (7a; 7b) and which galvanically connect adjacent first and second planar-parallel energy storage cells (1; 2) and which essentially contact all the first or second electrode elements (1a; 2a) of adjacent first and second planar-parallel energy storage cells (1; 2);
   a first planar pole terminal (6b) which makes electrical contact with an imparted first polarity of the first electrode elements (1a) of a first of the plurality of first planar-parallel energy storage cells (1), the first cell arranged at an end of the electrical energy module (30), and along the first side face of one of the two storage cell stacks (7a); and
   a second planar pole terminal (6a) which makes electrical contact with an imparted second polarity of the first electrode elements (1a) of a first of the plurality of first planar-parallel energy storage cells (1), the first cell arranged at the end of the electrical energy module (30), and along the first side face of the other of the two storage cell stacks (7b), wherein the first planar pole terminal (6*b*) and the second planar pole terminal (6*a*) are arranged parallel to one another between the two storage cell stacks (7*a*; 7*b*).

3. The electrical energy storage module (20) as claimed in claim 1, also comprising:
   an insulation layer (8) which is arranged between the first planar pole terminal (6*b*) and the second planar pole terminal (6*a*) in order to galvanically insulate the pole terminals (6*a*; 6*b*).

4. The electrical energy storage module (20) as claimed in claim 1, also comprising:
   a housing (4) which includes the plurality of groups of first planar-parallel energy storage cells (1), the plurality of groups of second planar-parallel energy storage cells (2) and the plurality of planar contact elements (5).

5. The electrical energy storage module (20) as claimed in claim 4, wherein the housing (4) is composed of an electrically non-conductive material.

6. A method (40) for manufacturing an electrical energy storage module (20; 30), comprising the steps:
   providing an alternating arrangement of a plurality of groups of first planar-parallel energy storage cells (1) which each have first electrode elements (1*a*), and a plurality of groups of second planar-parallel energy storage cells (2) which are arranged planar-parallel with respect to the plurality of groups of first planar-parallel energy storage cells (1) and each have second electrode elements (2*a*), in at least one storage cell stack (7; 7*a*; 7*b*) along a first direction of extent of the storage cell stack (7; 7*a*; 7*b*) extending from a first end face to a second end face, the at least one storage cell stack (7; 7*a*; 7*b*) having a plurality of side faces connecting the first and second end faces, wherein the first electrode elements (1*a*) impart to a first side face of the plurality of side faces of the at least one storage cell stack (7; 7*a*; 7*b*) a different polarity from a polarity imparted to the first side face by the second electrode elements (2*a*);
   providing a plurality of planar contact elements (5) making contact essentially with all the first or second electrode elements (1*a*; 2*a*) of the adjacent groups of first and second planar-parallel energy storage cells (1; 2), the plurality of planar contact elements (5) being arranged on the first side face and on a second side face of the storage cell stack (7; 7*a*; 7*b*), the plurality of planar contact elements (5) galvanically connecting adjacent groups of first and second planar-parallel energy storage cells (1; 2); and
   arranging first and second planar pole terminals (6*a*, 6*b*) in electrical contact with the respective imparted first and second polarities of first or second electrode elements (1*a*; 2*a*) at either the first end face or each of the first and second end faces of the at least one storage cell stack (7; 7*a*; 7*b*).

7. The electrical energy storage module (30) as claimed in claim 2, also comprising:
   an insulation layer (8) which is arranged between the first planar pole terminal (6*b*) and the second planar pole terminal (6*a*) in order to galvanically insulate the pole terminals (6*a*; 6*b*).

8. The electrical energy storage module (30) as claimed in claim 2, also comprising:
   a housing (4) which includes the plurality of first planar-parallel energy storage cells (1), the plurality of second planar-parallel energy storage cells (2) and the plurality of planar contact elements (5).

9. The electrical energy storage module (30) as claimed in claim 8, wherein the housing (4) is composed of an electrically non-conductive material.

\* \* \* \* \*